(12) United States Patent
Li et al.

(10) Patent No.: US 11,876,876 B2
(45) Date of Patent: Jan. 16, 2024

(54) COMMUNICATION CONVERSION METHOD, GATEWAY DEVICE, NETWORK SYSTEM AND COMPUTER MEDIUM

(71) Applicant: Siemens Aktiengesellschaft, Munich (DE)

(72) Inventors: Dong Li, Beijing (CN); Xiao Bo Yang, Beijing (CN); Yao Lei Kang, Beijing (CN); Tong Zhou Wang, Beijing (CN); Chuan Yu Zhang, Beijing (CN); Jian Yong Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/927,277

(22) PCT Filed: May 28, 2020

(86) PCT No.: PCT/CN2020/092985
§ 371 (c)(1),
(2) Date: Nov. 22, 2022

(87) PCT Pub. No.: WO2021/237588
PCT Pub. Date: Dec. 2, 2021

(65) Prior Publication Data
US 2023/0199087 A1    Jun. 22, 2023

(51) Int. Cl.
*H04L 67/51* (2022.01)
*H04L 67/55* (2022.01)
(Continued)

(52) U.S. Cl.
CPC .............. *H04L 67/60* (2022.05); *H04L 67/51* (2022.05); *H04L 67/55* (2022.05); *H04L 67/56* (2022.05)

(58) Field of Classification Search
None
See application file for complete search history.

(56) References Cited

U.S. PATENT DOCUMENTS

| 2006/0036679 | A1 | 2/2006 | Goodmn | G06F 15/16 |
| 2013/0246577 | A1* | 9/2013 | Gonzales | H04L 65/612 |
| | | | | 709/219 |
| 2018/0167476 | A1* | 6/2018 | Hoffner | H04L 67/55 |

FOREIGN PATENT DOCUMENTS

| CN | 103338267 | 10/2013 | ............. H04L 29/08 |
| CN | 108696551 | 10/2018 | ............. H04L 29/08 |

(Continued)

OTHER PUBLICATIONS

Search Report for International Application No. PCT/CN2020/092985, 4 pages, dated Feb. 18, 2021.

*Primary Examiner* — Lance Leonard Barry
(74) *Attorney, Agent, or Firm* — Slayden Grubert Beard PLLC

(57) ABSTRACT

Various embodiments of the teachings herein include methods for implementing communication conversion between a server-client system and a publish-subscribe (pub-sub) system. An example may include: receiving a message from the pub-sub system, wherein a topic of the message includes information related to a target service in the server-client system to which the message is to be sent, and a payload of the message includes identification information of a consumer in the pub-sub system, wherein the consumer is to receive a response message from the server-client system; parsing the message to determine a host and a service provider that provide the target service, and the consumer who is to receive the response message; sending a request message for the target service to the service provider on the determined host; receiving the response message; adding the (Continued)

identification information to the response message; and sending it to the pub-sub system.

9 Claims, 6 Drawing Sheets

(51) Int. Cl.
*H04L 67/60* (2022.01)
*H04L 67/56* (2022.01)

(56) References Cited

FOREIGN PATENT DOCUMENTS

| | | | |
|---|---|---|---|
| CN | 109618005 | | 4/2019 |
| KR | 102042164 | B1 * | 11/2019 |
| WO | WO-2021095936 | A1 * | 5/2021 |

* cited by examiner

COMMUNICATION CONVERSION METHOD, GATEWAY DEVICE, NETWORK SYSTEM AND COMPUTER MEDIUM

CROSS-REFERENCE TO RELATED APPLICATIONS

This application is a U. S. National Stage Application of International Application No. PCT/CN2020/092985 filed May 28, 2020, which designates the United States of America, the contents of which are hereby incorporated by reference in their entirety.

TECHNICAL FIELD

The present disclosure generally relates to the field of network technologies. Various embodiments of the teachings herein include communication conversion methods and/or systems for implementing communication between a server-client system and a pub-sub system.

BACKGROUND

Recently, the OPC Foundation has added a pub-sub capability to the specifications as an alternative to the client-server model and its request-response approach. In concept, publishers (data sources) in the pub-sub model send messages to a broker (message broker) that relays the messages to data-consumer nodes that have previously requested to be sent messages on a particular subject. Compared with the client-server model, the pub-sub model decouples data sources with data consumers and transforms a system from a centralized model to a distributed model.

A key advantage of such a frame structure is that it simplifies software running on programmable logic controllers (PLCs), human-machine interfaces (HMIs), enterprise resource planning (ERP) systems crossing systems of different suppliers, and other IT systems. The result is that a factory can be set up quicker, gathering and analyzing more information. This additional analysis can improve operational efficiency and, by spying problems early, reduce downtime.

In the prior art, Eclipse 4Diac™ provides an open source architecture for a distributed industrial process measurement and control system based on the IEC 61499 standard. It can use publishers and subscribers for application communication. However, in this method, engineers need to manually configure a pub/sub function block for each data point.

SUMMARY

The summary of the present disclosure is given below to provide a basic understanding of some aspects of the teachings herein. It should be understood that the summary is not an exhaustive explanation of the present disclosure. The summary is neither intended to determine the key or important parts of the teachings herein, nor to limit the scope of the present disclosure. The object thereof is merely to give some concepts in a simplified form, as a prelude to the more detailed description presented later. In view of the above, the present disclosure describes methods and/or systems that can simply and conveniently implement communication conversion between a conventional client-server-based system and a pub-sub mode-based system.

For example, some embodiments of the teachings herein include a method for implementing communication conversion between a server-client system and a publish-subscribe (pub-sub) system, comprising: receiving a message from the pub-sub system, a topic of the message comprising information related to a target service in the server-client system to which the message is to be sent, and a payload of the message comprising identification information of a consumer in the pub-sub system, and the consumer is to receive a response message from the server-client system; parsing the message, and determining a host and a service provider that provide the target service, and the consumer who is to receive the response message; sending a request message for the target service to the service provider on the determined host; receiving the response message from the service provider; and adding the identification information of the consumer to the response message, and sending the response message to the pub-sub system.

In some embodiments, the topic of the message comprises the names of the host and the service provider that provide the target service and the name of the target service.

In some embodiments, the payload of the message further comprises a function name and a parameter that correspond to the target service to be subscribed to by the consumer.

In some embodiments, before the receiving a message from the pub-sub system, the method further comprises: scanning a service provided by the service provider in the server-client system; and publishing the service in the pub-sub system, such that the consumer in the pub-sub system is capable of establishing a connection with the service provider of the service in which the consumer is interested.

As another example, some embodiments include a gateway device comprising: a pub-sub system message receiving unit configured to receive a message from the pub-sub system, a topic of the message comprising information related to a target service in the server-client system to which the message is to be sent, and a payload of the message comprising identification information of a consumer in the pub-sub system, and the consumer is to receive a response message from the server-client system; a parsing unit configured to parse the message, and determine a host and a service provider that provide the target service, and the consumer who is to receive the response message; a request message sending unit configured to send a request message for the target service to the service provider on the determined host; a response message receiving unit configured to receive the response message from the service provider; and a server-client system message sending unit configured to add the identification information of the consumer to the response message, and send the response message to the pub-sub system.

In some embodiments, the topic of the message comprises the names of the host and the service provider that provide the target service and the name of the target service.

In some embodiments, the payload of the message further comprises a function name and a parameter that correspond to the target service to be subscribed to by the consumer.

In some embodiments, the gateway device further comprises a service scanning unit configured to scan a service provided by the service provider in the server-client system, and publish the service in the pub-sub system, such that the consumer in the pub-sub system is capable of establishing a connection with the service provider of the service to which the consumer wants to subscribe.

As another example, some embodiments include a network system, comprising: a server-client system and a pub-sub system, wherein one gateway device as described herein is provided in the server-client system, and the server-client system communicates with the pub-sub system via the gateway device.

As another example, some embodiments include a gateway device (600), comprising: at least one processor (602); and a memory (604) coupled to the at least one processor (602), wherein the memory is configured to store instructions that, when executed by the at least one processor (602), cause the processor (602) to perform one or more of the methods described herein.

As another example, some embodiments include a non-transitory machine-readable storage medium storing executable instructions that, when executed, cause a machine to perform one or more of the methods described herein.

As another example, some embodiments include a computer program, comprising computer executable instructions that, when executed, cause at least one processor to perform one or more of the methods described herein.

As another example, some embodiments include a computer program product tangibly stored on a computer-readable medium, and comprising computer executable instructions that, when executed, cause at least one processor to perform one or more of the methods described herein.

BRIEF DESCRIPTION OF THE DRAWINGS

The foregoing and other objectives, features, and advantages of the teachings of the present disclosure can be more easily understood with reference to the following descriptions of example embodiments in conjunction with the accompanying drawings. Components in the accompanying drawings are merely for illustrating the principles described herein. In the accompanying drawings, same or similar technical features or components are represented by using same or similar reference signs.

REFERENCE SIGNS

Figure 1:
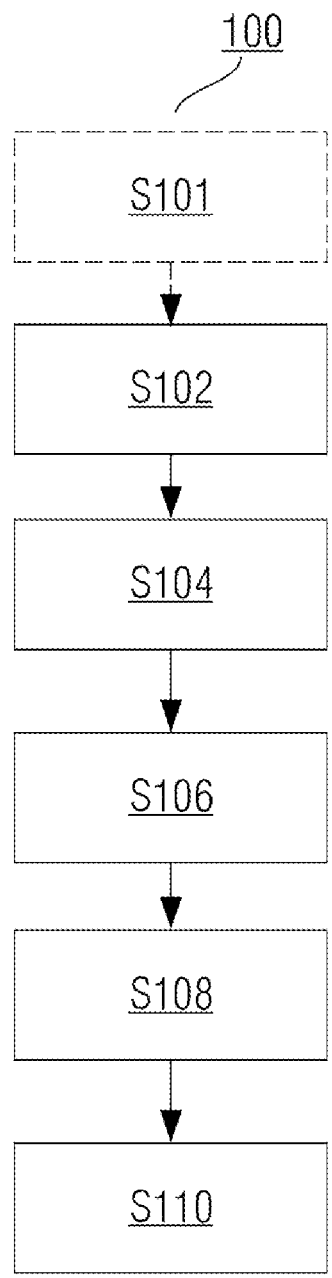
FIG. 1 is a flowchart of an exemplary process of a method for implementing communication conversion between a server-client system and a pub-sub system incorporating teachings of the present disclosure.

| | |
|---|---|
| 100: method for implementing communication conversion between a server-client system and a pub-sub system | S101, S102, S104, S106, S108, and S110: steps |
| 200: gateway device | 202: pub-sub system message receiving unit |
| 204: parsing unit | 206: request message sending unit |
| 208: response message receiving unit | 210: server-client system message sending unit |

-continued

| | |
|---|---|
| 300: network system | 301: server-client system |
| 302, 402, and 502: pub-sub system | 401 and 501: servers |
| 403 and 503: service providers | 220: client |
| 404 and 504: message brokers | 405 and 505: consumer A |
| 406: consumer B | S411, S412-1, S412-2, S413-1, S413-2, S414, S415, S416, S417-1, S417-2, S418-1, and S418-2: steps |
| S51-S55, S511-S554: steps | 600: gateway device |
| 602: processor | 604: memory |

DETAILED DESCRIPTION

Some embodiments include a method for implementing communication conversion between a server-client system and a pub-sub system, including: receiving a message from the pub-sub system, a topic of the message including information related to a target service in the server-client system to which the message is to be sent, and a payload of the message including identification information of a consumer in the pub-sub system, the consumer being to receive a response message from the server-client system; parsing the message, and determining a host and a service provider that provide the target service, and the consumer who is to receive the response message; sending a request message for the target service to the service provider on the determined host; receiving the response message from the service provider; and adding the identification information of the consumer to the response message, and sending the response message to the pub-sub system.

In some embodiments, the topic of the message includes the names of the host and the service provider that provide the target service and the name of the target service.

In some embodiments, the payload of the message further includes a function name and a parameter that correspond to the target service to be subscribed to by the consumer.

In some embodiments, before the receiving a message from the pub-sub system, the method further includes: scanning a service provided by the service provider in the server-client system; and publishing the service in the pub-sub system, such that the consumer in the pub-sub system is capable of establishing a connection with the service provider of the service in which the consumer is interested.

Some embodiments include a gateway device including: a pub-sub system message receiving unit configured to receive a message from the pub-sub system, a topic of the message including information related to a target service in the server-client system to which the message is to be sent, and a payload of the message including identification information of a consumer in the pub-sub system, the consumer being to receive a response message from the server-client system; a parsing unit configured to parse the message, and determine a host and a service provider that provide the target service, and the consumer who is to receive the response message; a request message sending unit configured to send a request message for the target service to the service provider on the determined host; a response message receiving unit configured to receive the response message from the service provider; and a server-client system message sending unit configured to add the identification information of the consumer to the response message, and send the response message to the pub-sub system.

In some embodiments, the topic of the message includes the names of the host and the service provider that provide the target service and the name of the target service.

In some embodiments, the payload of the message further includes a function name and a parameter that correspond to the target service to be subscribed to by the consumer.

In some embodiments, the gateway device further includes: a service scanning unit configured to scan a service provided by the service provider in the server-client system, and publish the service in the pub-sub system, such that the consumer in the pub-sub system is capable of establishing a connection with the service provider of the service to which the consumer wants to subscribe.

Some embodiments include a network system including: a server-client system and a pub-sub system, where one gateway device according to the above aspect is provided in the server-client system, and the server-client system communicates with the pub-sub system via the gateway device.

Some embodiments include a gateway device including: at least one processor; and a memory coupled to the at least one processor, where the memory is configured to store instructions that, when executed by the at least one processor, cause the processor to perform the method described above.

Some embodiments include a non-transitory machine-readable storage medium which stores executable instructions that, when executed, cause the machine to perform one or more of the methods described herein.

Some embodiments include a computer program including computer executable instructions that, when executed, cause at least one processor to perform one or more of the methods described herein.

Some embodiments include a computer program product tangibly stored in a computer-readable medium and includes computer executable instructions that, when executed, cause at least one processor to perform one or more of the methods described herein.

In some embodiments of the teachings of the present disclosure, roles in the network system and the topic and payload of the sent message are redefined, so that the communication between the server-client system and the pub-sub system may be supported.

In some embodiments, services that the server can provide may be automatically scanned and broadcast without manual configuration for each data point.

In some embodiments, pub/sub clients may be created dynamically and automatically.

In some embodiments, a fusion method for IT and OT systems is provided, and the method according to the present disclosure is a low-code method, which reduces a development burden of technical personnel, and improves industrial communication efficiency.

Using the methods described herein may expand an application scenario of products, and improve competitiveness of the products.

The subject matter described herein are now discussed with reference to exemplary implementations. It should be understood that the discussion of these implementations is merely intended to help a person skilled in the art to better understand and implement the subject matter described herein, but not to limit the protection scope, applicability or examples set forth in the claims. The functions and arrangement of the discussed elements can be changed without departing from the protection scope of the present disclosure. Various processes or components may be omitted, replaced, or added in various examples as required. For example, the described method may be performed in an order different from the one described, and the steps may be added, omitted, or combined. In addition, the features described in some examples can also be combined in other examples.

As used herein, the term "include" and variants thereof represent an open term, which means "including but not limited to". The term "based on" represents "at least partially based on". The terms "an embodiment" and "the embodiment" represent "at least one embodiment". The term "another embodiment" denotes "at least one another embodiment". The terms "first", "second", and the like may refer to different or the same objects. Other definitions, whether explicit or implicit, can be included below. Unless expressly specified in the context, the definition of a term is consistent throughout the specification.

In a client-server system, a server provides functions or services to one or more clients for which the client initiates a request. The client exchanges messages with the server in a request-response model. The client sends a request with a server address, and the server replies with a response with a client address.

In a pub-sub system, a publisher publishes a message on an intermediate message broker or an event bus, and a subscriber registers the subscription with the broker and let the broker to perform filtering. This model decouples service providers with consumers, and consumers only need to pre-configure an address of the broker.

In the present disclosure, a method that can simply and conveniently implement communication conversion between a conventional client-server-based system and a pub-sub mode-based system is proposed.

The following describes an example method for implementing communication conversion between a server-client system and a pub-sub system, a gateway device, and a network system incorporating teachings of the present disclosure with reference to accompanying drawings.

FIG. 1 is a flowchart of an exemplary process of a method 100 for implementing communication conversion between a server-client system and a pub-sub system incorporating teachings of the present disclosure.

First, in step S102, a message is received from the pub-sub system, where a topic of the message includes information related to a target service in the server-client system to which the message is to be sent, and a payload of the message includes identification information of a consumer in the pub-sub system, and the consumer is to receive a response message from the server-client system. The message to be sent from the pub-sub system to the server-client system is defined. The topic of the message can represent the information related to the target service in the server-client system to which the message is to be sent, for example, the topic of the message may be defined to include character strings of the names of a host and a service provider that provide the target service and a character string of the name of the target service, such that the server-client system can determine, after receiving the message, a server provider on a host to which the message is to be sent. The payload of the message may include the identification information of the consumer in the pub-sub system that is to receive the response message, so that after the response message from the server-client system is sent to the pub-sub system, the broker therein may know the consumer to which the response message is to be forwarded.

The topic and payload of the message may be defined as a character string in the JSON format, XML format, binary format, or the like. In the present invention, a specific form of the topic and the payload of the message is not limited.

In some embodiments, the payload of the message may further include the name of a function corresponding to the target service, a parameter of the function, and the like. In this way, the name of the function and the parameter of the function are placed in the payload instead of the topic of the message, which may reduce the number of topics. In addition, mapping onto specific functions may be performed for calling, so as to trigger the service of the server.

After the message from the pub-sub system is received, in step S104, the message is parsed, and a host and a service provider that provide the target service, and the consumer who is to receive the response message are determined.

In step S106, a request message for the target service is sent to the service provider on the determined host. A data communication model performed on the server-client system side is a common request-response model. Since the host and service provider that provide the target service are determined in the previous step S104, the request message for the target service may be sent directly to the corresponding service provider.

Next, in step S108, the response message from the service provider may be received.

In step S110, the identification information of the consumer is added to the response message based on the consumer in the pub-sub system that is determined in step S104 and that is to receive the response message, for example, the identification information may be added to a topic of the response message to be sent to the pub-sub system, and then the message is sent to the pub-sub system. After receiving the message, the broker in the pub-sub system may determine, based on the identification information of the consumer, the consumer to which the response message is to be sent. Those skilled in the art may understand a specific process of how the broker in the pub-sub system is to forward the message, which will not be described in detail herein.

In the above method, the request-response model is used in the server-client system, the pub-sub model is used in the pub-sub system, and the communication conversion between the server-client system and the pub-sub system may be implemented without making any changes to each of the systems. Through the above steps, the consumer in the pub-sub system may request a service in which the consumer is interested from the server in the server-client.

In some embodiments, before the server-client receives the message from the consumer in the pub-sub system, step S101 may be included, that is, a service provided by the service provider in the server-client system is first scanned, and then the service is published in the pub-sub system, such that the consumer in the pub-sub system is capable of establishing a connection with the service provider of the service in which the consumer is interested. In this way, services may be automatically scanned and broadcast, and pub/sub clients may be created dynamically and automatically through gateways.

In some embodiments, service repositories of all server providers may be scanned and then corresponding topics may be subscribed. All services, including corresponding function names and parameters, may be organized as messages in JSON format with a topic thereof defined as "adv", which represents an advertisement. In some embodiments, advertisement messages may be broadcast periodically, and each consumer may subscribe to topics of interest, and obtain services of interest by parsing advertisements, for example, may obtain function names and parameters.

Figure 2:
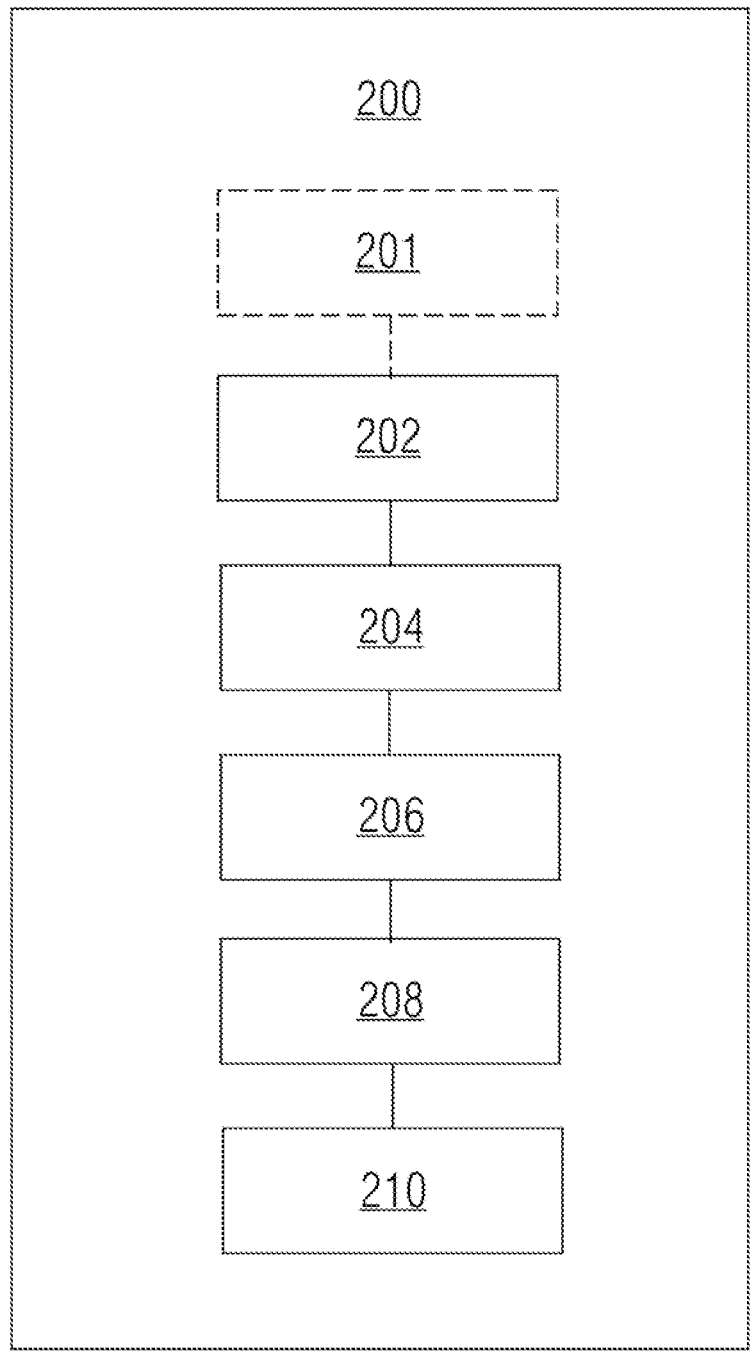
FIG. 2 is a block diagram of an exemplary configuration of a gateway device 200 incorporating teachings of the present disclosure.

FIG. 2 is a block diagram of an exemplary configuration of a gateway device 200 incorporating teachings of the present disclosure. Through the gateway device, communication conversion between a server-client system and a pub-sub system is implemented. As shown in FIG. 2, the gateway device 200 includes: a pub-sub system message receiving unit 202, a parsing unit 204, a request message sending unit 206, a response message receiving unit 208, and a server-client system message sending unit 210.

The pub-sub system message receiving unit 202 is configured to receive a message from the pub-sub system, a topic of the message including information related to a target service in the server-client system to which the message is to be sent, and a payload of the message including identification information of a consumer in the pub-sub system, and the consumer is to receive a response message from the server-client system.

The parsing unit 204 is configured to parse the message, and determine a host and a service provider that provide the target service, and the consumer who is to receive the response message.

The request message sending unit 206 is configured to send a request message for the target service to the service provider on the determined host.

The response message receiving unit 208 is configured to receive the response message from the service provider.

The server-client system message sending unit 210 is configured to add the identification information of the consumer to the response message, and send the response message to the pub-sub system.

The topic of the message may include the names of the host and the service provider that provide the target service and the name of the target service. The payload of the message may further include a function name and a parameter that correspond to the target service to be subscribed to by the consumer.

In some embodiments, the gateway device may further include: a service scanning unit 201 configured to scan a service provided by the service provider in the server-client system, and publish the service in the pub-sub system, such that the consumer in the pub-sub system is capable of establishing a connection with the service provider of the service to which the consumer wants to subscribe.

Details about operations and functions of various parts of the gateway device 200 shown in FIG. 2 may be, for example, the same as or similar to related parts in the embodiments of the method 100 for implementing communication conversion between a server-client system and a pub-sub system in the present disclosure described with reference to FIG. 1, and are not repeated herein. Through the above methods or gateway devices, the communication conversion between the server-client system and the pub-sub system may be implemented. It should be further noted that the gateway device 200 and a structure of constituent units of the gateway device shown in FIG. 2 are merely examples, and those skilled in the art may modify the structural block diagram of FIG. 2 according to requirements.

Figure 3:
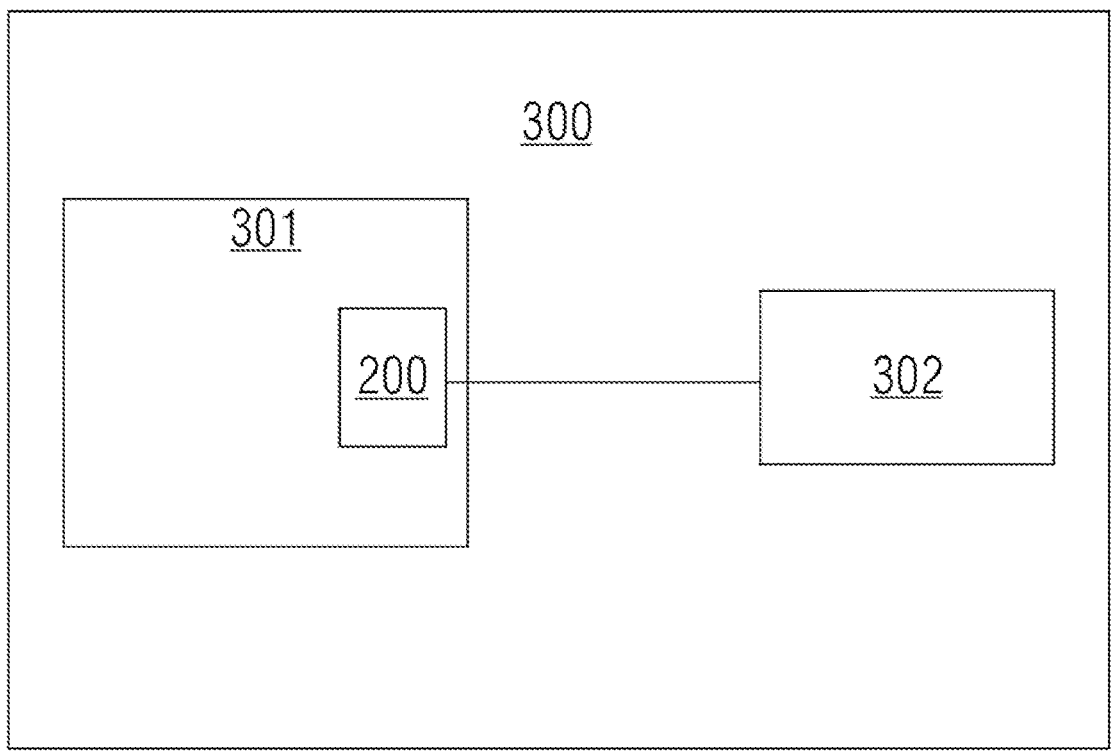
FIG. 3 is a schematic block diagram of a network system performing communication using a gateway device incorporating teachings of the present disclosure.

FIG. 3 is a schematic block diagram of a network system 300 performing communication using a gateway device incorporating teachings of the present disclosure. The network system 300 shown in FIG. 3 includes a server-client system 301 and a pub-sub system 302. One gateway device 200 as described above is provided in the server-client system 301. The server-client system 301 may communicate with the pub-sub system 302 through the gateway device 200.

Figure 4:
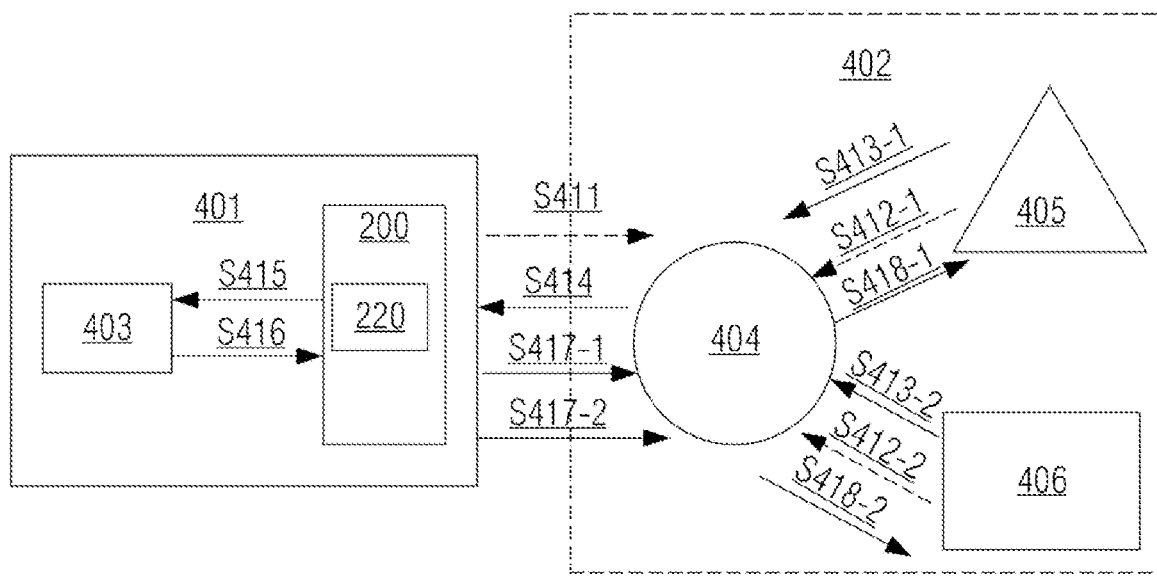
FIG. 4 is a flowchart of operations for a network system to perform communication using a gateway device incorporating teachings of the present disclosure.

A specific example of performing communication between a server-client system 401 and a pub-sub system 402 through the gateway device 200 is described in detail below with reference to FIG. 4. In FIG. 4, a detailed process in which a consumer A 405 and a consumer B 406 in the pub-sub system 402 subscribe to a service in the server-client system 401 is specifically described. In FIG. 4, 401 represents a server Host1 in the client-server system, 402 represents the pub-sub system, 403 represents a provider (service provider) Provider1 on Host1, 200 represents the gateway device as described above, 220 represents a client Client1 created by the gateway device, 404 represents a broker (message broker), 405 represents a consumer A, and 406 represents a consumer B.

First, in step S411, the gateway device 220 subscribes to a service from the broker 404 "Sub Host1/Provider1/Interface1".

Next, the consumer A 405 subscribes to the service in S412-1 "Sub ClientA/InterfaceReply1", and then in step S413-1, publishes "Pub Host1/Provider1/Interface1" to the broker 404, and the topic of the message includes the name Host1 of a host of the service to be subscribed to, the name Provider1 of the service provider, and the name Interface1 of the service to be subscribed to. Similarly, the consumer B 406 subscribes to the service in S412-2 "ClientB/InterfaceReply1", and then in S413-2, publishes "Pub Host1/Provider1/Interface1" to the broker 404, and the topic of the message includes the name Host1 of the host of the service to be subscribed to, the name Provider1 of the service provider, and the name Interface1 of the service to be subscribed to.

In step S414, the broker 404 forwards the message "Fwd Host1/Provider1/Interface1".

In step S415, the client Client1 220 is created in the gateway device 200, and Client1 220 sends a request message "Interface1" to Provider1 403.

In step S416, Client1 220 receives a response message "InterfaceReply1" from Provider1 403.

In steps S417-1 and S417-2, Client1 220 publishes "Pub ClientA/InterfaceReply1" and "Pub ClientB/InterfaceReply1" separately.

In steps S418-1 and S418-2, the broker 404 forwards "Fwd ClientA/InterfaceReply1" and "Fwd ClientB/InterfaceReply1" to the consumer A and the consumer B, respectively.

Through the above steps, the entire process in which the consumer A and the consumer B in the pub-sub system subscribe to the service Interface1 from the service provider Provider1 on the host Host1 in the server-client system is completed.

In the above process, the service provider (server) subscribes to the service that may be provided, the consumers publish the message as a request, and the consumers may also subscribe to a subject received as a response to the request.

Figure 5:
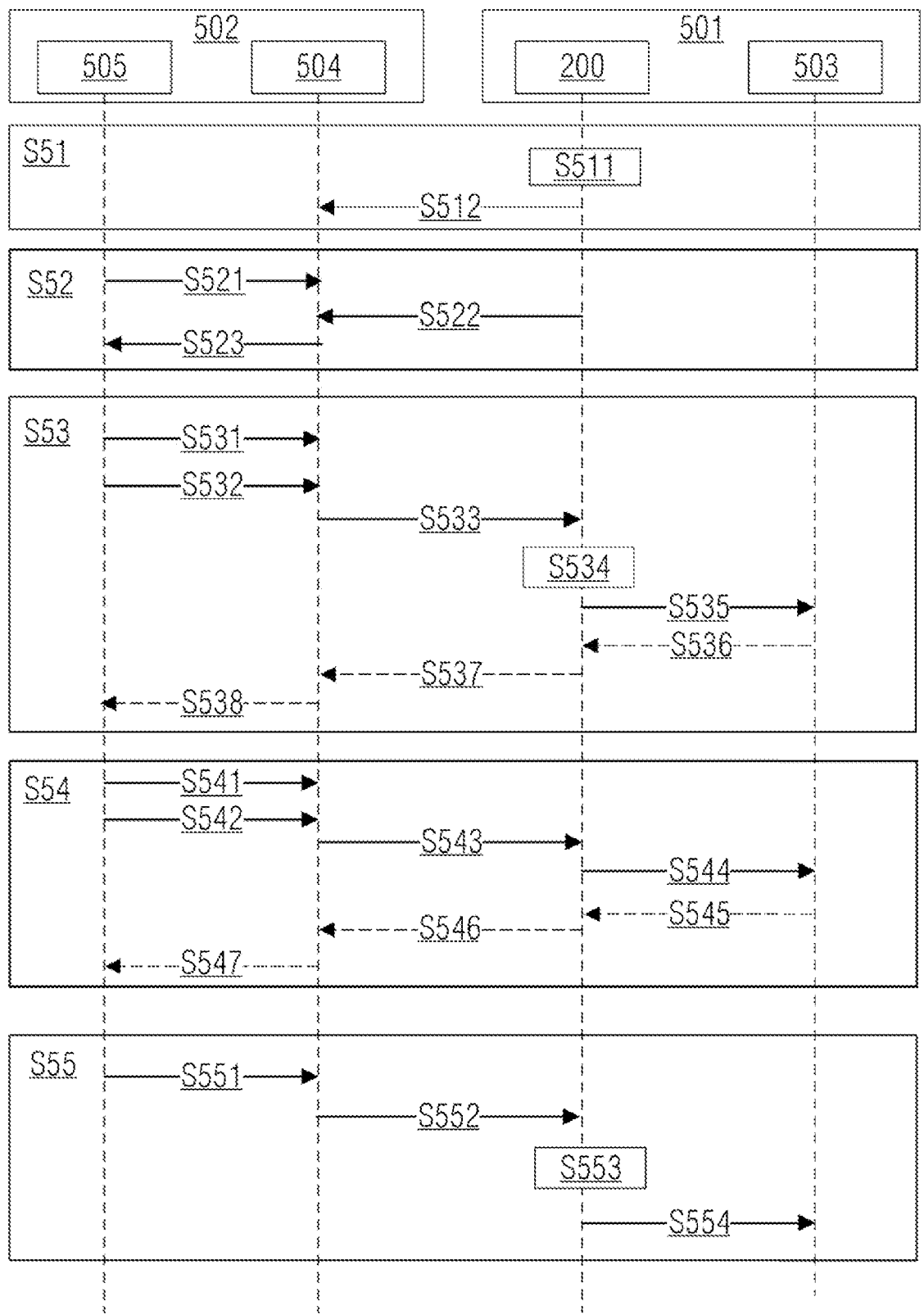
FIG. 5 is a flowchart of operations for performing communication between a server-client system and a pub-sub system incorporating teachings of the present disclosure.

A specific example of performing communication between a server-client system and a pub-sub system according to another embodiment of the present disclosure is described below with reference to FIG. 5. In FIG. 5, 501 represents Host1 (a server), 502 represents the pub-sub system, and Provider1 (a service provider) 503 and a gateway 200 are provided on Host1 501. 504 represents a broker and 505 represents a consumer A.

An entire communication process may be divided into five steps, including a scanning step S51, a discovery step S52, a connection step S53, a request/response step S54, and a disconnection step S55.

Specifically, the scanning step S51 includes sub-steps S511 and S512.

In sub-step S511, the gateway 200 scans all services that may be provided by the service provider on Host1 501, and then in sub-step S512, the gateway 200 subscribes to all services from the broker 504 of the pub-sub system "Sub all interface".

The discovery step S52 includes sub-steps S521, S522, and S523. In sub-step S521, the consumer A 505 in the pub-sub system subscribes to an advertisement in Host1 501 "Sub Host1 adv". In sub-step S522, the gateway 200 publishes the advertisement of all the services that Host1 501 can provide to the broker 504 "Pub Host1 adv". In sub-step S523, the broker 504 forwards the advertisement to the consumer A 505 "Forward Host1 adv".

The connection step S53 includes sub-steps S531 to S538. In sub-step S531, the consumer A 505 subscribes to an "onConnect" message from the broker 504 "Sub"onConnect" message". In sub-step S532, the consumer A 505 publishes a "Connect" message to the broker 504 "Pub"Connect"message". In sub-step S533, the broker 504 forwards the "Connect" message to the gateway 200 "Forward"Connect" message". In sub-step S534, the gateway 200 creates a client, and in sub-step S535, the client sends a connection request message "Interface1 Connect( )" for the service "Interface1" to Provider1 503. In sub-step S536, Provider1 503 sends a response message "Interface1 Connected( )" to the gateway 200. In sub-step S537, the gateway 200 publishes the message to the broker 504 "Pub "onConnect" message". In sub-step S538, the broker 504 forwards the "onConnect" message to the consumer A 505 "Forward"onConnect"message".

The request/response step S54 includes sub-steps S541 to S547. In sub-step S541, the consumer A 505 subscribes to an "onGet" message from the broker 504 "Sub"onGet"message". In sub-step S542, the consumer A 505 publishes a "Get" message to the broker 504 "Pub"Get"message". In sub-step S543, the broker 504 forwards the "Get" message to the gateway 200 "Forward"Get" message". In sub-step S544, the client sends an obtaining request message "Interface1 Get( )" for the service "Interface1" to Provider1 503. In sub-step S545, Provider1 503 sends a response message "Interface1 onGet( )" to the gateway 200. In sub-step S546, the gateway 200 publishes the message to the broker 504 "Pub"onGet" message". In sub-step S547, the broker 504 forwards the "onGet" message to the consumer A "Forward"onGet" message".

Finally, the disconnection step S55 includes sub-steps S551 to S554. In sub-step S551, the consumer A 505 publishes a "Disconnect" message to the broker 504 "Pub"disconnect" message". In sub-step S552, the broker 504 forwards the "Disconnect" message to the gateway 200 "Forward"Disconnect" message". In sub-step S553, the gateway 200 deletes the created client, and in sub-step S554, sends the "Interface1 Disconnect( )" message to Provider1 503.

In the above process, since the topic of the message received by the gateway from the pub-sub system includes the name of the host in the server-client system that provides the service, the name of the service provider, and the name of the service, the gateway may send the request message for the target service to the corresponding service provider, and for the response message returned from the server, the gateway may identify the target consumer of the response message in the response message based on the information of the consumer sending the message that is included in the payload of the received message.

The specific example of performing communication between the server-client system and the pub-sub system is described in detail above with reference to FIG. 5. Those skilled in the art may understand that the present disclosure is not limited to the steps shown in the example.

In some embodiments, after a connection is established, the connection may be maintained, such that multiple communications may be performed between the consumer and the server, or the connection may be established before each communication and then disconnected after the communication. As described above, the method for implementing communication conversion between a server-client system and a pub-sub system, the gateway device, and the network system according to the embodiments of the present disclosure are described with reference to FIG. 1 to FIG. 5. The gateway device as described above may be implemented by hardware, or may be implemented by software or a combination of hardware and software.

Figure 6:
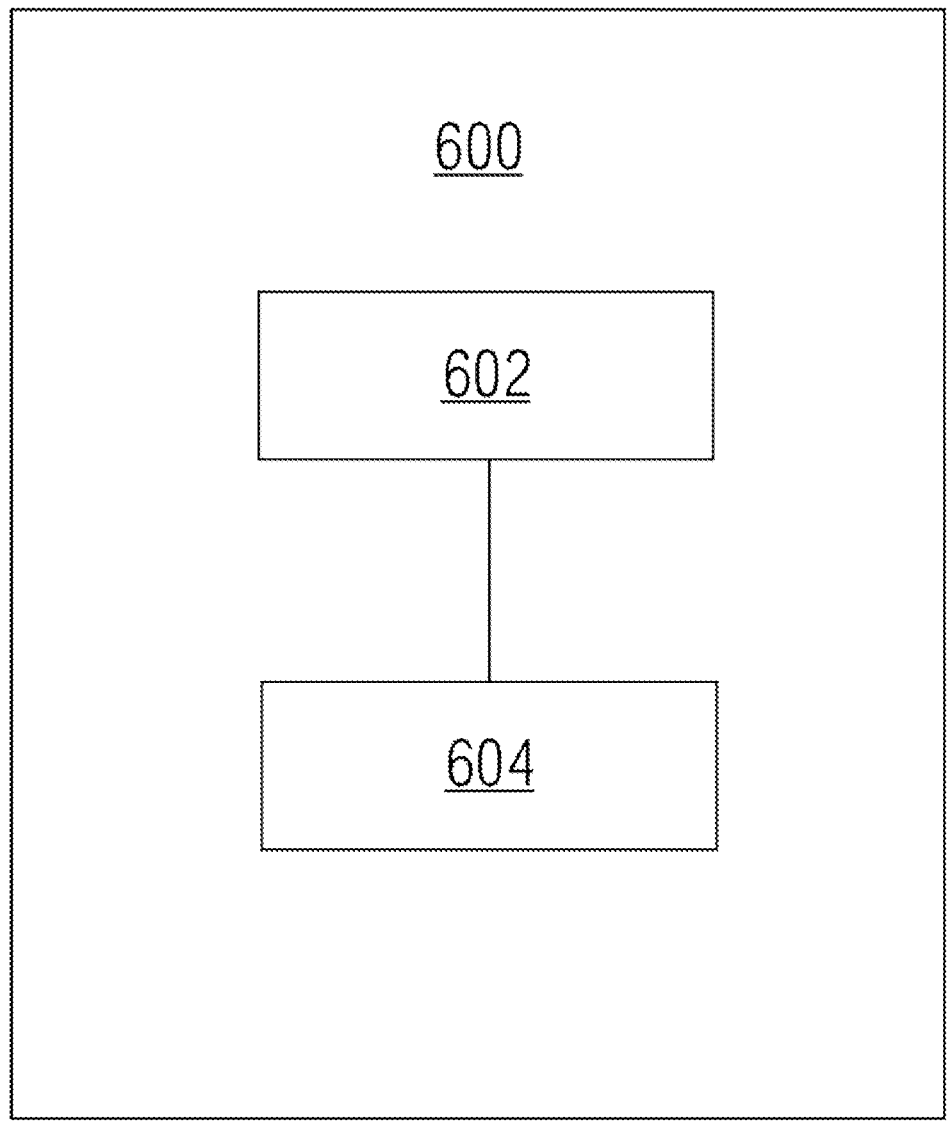
FIG. 6 is a block diagram of a gateway device of a method for implementing communication conversion between a server-client system and a pub-sub system incorporating teachings of the present disclosure.

FIG. 6 is a block diagram of a gateway device 600 of a method for implementing communication conversion between a server-client system and a pub-sub system incorporating teachings of the present disclosure. In some embodiments, the gateway device 600 may include at least one processor 602, and the processor 602 executes at least one computer-readable instruction (i.e., the above element implemented in the form of software) stored or encoded in a computer-readable storage medium (i.e., a memory 604).

In some embodiments, computer executable instructions are stored in the memory 604, and when executed, cause at least one processor 602 to implement the method for implementing communication conversion between a server-client system and a pub-sub system described above with reference to FIG. 1. It should be understood that the computer executable instructions stored in the memory 604, when executed, cause the at least one processor 602 to perform various operations and functions described above in conjunction with FIG. 1 to FIG. 5 in the various embodiments of the present disclosure.

In some embodiments, a non-transitory machine-readable medium may include machine executable instructions (i.e., the above elements implemented in the form of software) that, when executed by a machine, cause the machine to perform various operations and functions described above in conjunction with FIG. 1 to FIG. 5. In some embodiments, a computer program includes computer executable instructions that, when executed, cause at least one processor to perform various operations and functions described above in conjunction with FIG. 1 to FIG. 5. In some embodiments, a computer program product includes computer executable instructions that, when executed, cause at least one processor to perform various operations and functions described above in conjunction with FIG. 1 to FIG. 5.

In the methods and gateway devices described herein, roles in the network system and the topic and payload of the sent message are redefined, so that the communication between the server-client system and the pub-sub system may be supported. Services that the server can provide may be automatically scanned and broadcast without manual configuration for each data point. Pub/sub clients may be created dynamically and automatically.

In some embodiments, a method for implementing communication between a server-client system and a pub-sub system of the present disclosure, a fusion method for IT and OT systems, and is a low-code method, which reduces a development burden of technical personnel, and improves industrial communication efficiency.

Using the method according to the present disclosure may expand an application scenario of products, and improve competitiveness of the products. Exemplary embodiments are described above in combination with the specific embodiments described in the accompanying drawings, but do not represent all the embodiments that can be implemented or fall within the protection scope of the claims. The term "exemplary" used throughout the present specification means "used as an example, an instance or an illustration", but does not mean "preferred" or "advantageous" over the other embodiments. For the purpose of providing an understanding of the described technologies, the specific embodiments include specific details. However, the technologies can be implemented without the specific details. In some embodiments, in order to avoid obscuring the described concepts in the embodiments, commonly known structures and apparatuses are shown in the form of a block diagram.

The descriptions above of the present disclosure are provided to enable any person of ordinary skill in the art to implement or use the teachings of the present disclosure. For a person of ordinary skill in the art, various modifications made to the present disclosure are obvious and the general principles defined herein may also be applied to other variants without departing from the protection scope of the present disclosure. Therefore, the present disclosure is not limited to the examples and designs described herein, and corresponds to the widest scope in accordance with the principles and novel features disclosed herein.

What is claimed is:

1. A method for implementing communication conversion between a server-client system and a publish-subscribe (pub-sub) system, the method comprising:
   receiving a message from the pub-sub system, wherein a topic of the message includes information related to a target service in the server-client system to which the message is to be sent, and a payload of the message includes identification information of a consumer in the pub-sub system, wherein the consumer is to receive a response message from the server-client system;
   parsing the message to determine a host and a service provider that provide the target service, and the consumer who is to receive the response message;
   sending a request message for the target service to the service provider on the determined host;
   receiving the response message from the service provider; and
   adding the identification information of the consumer to the response message and sending the response message to the pub-sub system.

2. The method according to claim 1, wherein the topic of the message comprises a host name and a service provider name providing the target service and a name of the target service.

3. The method according to claim 1, wherein the payload of the message further comprises a function name and a parameter that correspond to the target service to be subscribed to by the consumer.

4. The method according to claim 1, wherein before the receiving a message from the pub-sub system, the method further comprises:
   scanning a service provided by the service provider in the server-client system; and
   publishing the service in the pub-sub system, such that the consumer in the pub-sub system is capable of establishing a connection with the service provider of the service in which the consumer is interested.

5. A gateway device comprising:
   a publish-subscribe (pub-sub) system message receiving interface configured to receive a message from the pub-sub system, a topic of the message comprising information related to a target service in the server-client system to which the message is to be sent, and a payload of the message comprising identification information of a consumer in the pub-sub system, and the consumer is to receive a response message from the server-client system;

a parsing processor configured to parse the message to determine a host and a service provider that provide the target service and the consumer who is to receive the response message;

a request message sending interface unit configured to send a request message for the target service to the service provider on the determined host;

a response message receiving interface configured to receive the response message from the service provider; and a server-client system message sending processor configured to add the identification information of the consumer to the response message, and send the response message to the pub-sub system.

6. The gateway device according to claim 5, wherein the topic of the message comprises the names of the host and the service provider that provide the target service and the name of the target service.

7. The gateway device according to claim 5, wherein the payload of the message further comprises a function name and a parameter that correspond to the target service to be subscribed to by the consumer.

8. The gateway device according to claim 5, further comprising a service scanning processor configured to scan a service provided by the service provider in the server-client system, and publish the service in the pub-sub system, such that the consumer in the pub-sub system is capable of establishing a connection with the service provider of the service to which the consumer wants to subscribe.

9. A gateway device comprising:

a processor; and a memory coupled to the processor, wherein the memory stores instructions that, when executed by the processor, cause the processor to:

receive a message from a publish-subscribe (pub-sub) system, wherein a topic of the message includes information related to a target service in the server-client system to which the message is to be sent, and a payload of the message includes identification information of a consumer in the pub-sub system, wherein the consumer is to receive a response message from the server-client system;

parse the message to determine a host and a service provider that provide the target service, and the consumer who is to receive the response message;

send a request message for the target service to the service provider on the determined host;

receive the response message from the service provider; and add the identification information of the consumer to the response message and sending the response message to the pub-sub system.

* * * * *